Feb. 9, 1960 O. K. KELLEY 2,924,308
BRAKE COOLING SYSTEM
Filed Jan. 23, 1956 2 Sheets-Sheet 2

INVENTOR.
OLIVER K. KELLEY
BY
ATTORNEY

United States Patent Office 2,924,308
Patented Feb. 9, 1960

2,924,308

BRAKE COOLING SYSTEM

Oliver K. Kelley, Bloomfield Hills, Mich., assignor to General Motors Corporation, Detroit, Mich., a corporation of Delaware Application January 23, 1956, Serial No. 560,634

2 Claims. (Cl. 188—264)

This invention relates to a brake system adapted for use on a multiple wheel vehicle, and more particularly to a brake system for use on a motor vehicle. More specifically, the invention relates to a brake cooling system for the friction brakes of a motor vehicle adapted to have a liquid coolant circulated through the brakes for removing the heat of friction created during a brake application.

In a brake cooling system adapted to have a liquid coolant circulated through the brakes to remove the heat of friction during a brake application, a liquid pump is suitably driven by the vehicle or by a power element of the vehicle to effect a forced circulation through a conduit system for delivery of coolant to the several brakes of a motor vehicle for circulation through the brakes to effect heat removal from the braking elements. The liquid that is delivered to the several brakes of the vehicle is delivered to a heat exchange device for removal of the heat picked up in the brakes. The cooled liquid is then returned to the liquid circulating pumps so that liquid can again be circulated through the brakes to again pick up additional heat of friction from the braking elements.

In such a circulating system for coolant, there is provided a reservoir from which the liquid pump draws its supply of liquid for circulation to the brakes, the reservoir containing the excess quantity of liquid that is not immediately required for completely filling the brake circulating system. The reservoir is connected with the pumps for the circulating system by conventional conduits which do effect some resistance to flow of liquid, and to this extent tends to reduce the pumping capacity of the pumps for the liquid cooling system. Such resistance in the liquid lines between the reservoir and the circulating pumps may at times also result in cavitation in the pump which again reduces the flow capacity from the pump and therefore affects the efficiency of the brake cooling system.

It is therefore an object of this invention to provide for a forced liquid delivery of liquid coolant into the inlet suction lines for the pumps of the brake circulating system so as to effect a forced delivery of liquid into the pumps under pressure and thereby increase the pumping capacity of the coolant circulating pumps.

Since the liquid coolant is circulating in the circulating system for the brakes under forced flow as created by the liquid circulating pumps, the liquid will be delivered into the reservoir under pressure. It is therefore another object of this invention to utilize the kinetic energy of the liquid entering the reservoir to pressure charge the inlet line connected with the inlet side of the coolant circulating pumps. This can be effected by causing the coolant being delivered to the reservoir under pressure to be discharged tangentially to the inner periphery of the reservoir that has a cylindraceous cross section whereby to cause the liquid mass in the reservoir to rotate and form a vortex. The conduit line connecting the reservoir with the inlet side of the pumps is also placed tangential to the inner periphery of the cylindraceous cross section of the heat exchange device of the reservoir with the inlet end of the conduit directed oppositely to the direction of rotation of the liquid mass in the reservoir whereby the rotating liquid mass causes pressure delivery of liquid into the inlet line connecting the reservoir with the pump to pressure charge the line and thereby utilize the kinetic energy expended in delivering the liquid under pressure into the reservoir.

It is another object of the invention to utilize the liquid from the reservoir of the brake coolant system to supply liquid to the brake actuating system for the brakes and thereby insure a full charge of liquid in the hydraulic lines connected between the brake actuating master cylinder operated by the conventional brake pedal and the wheel cylinders of the respective brakes on the vehicle. For this purpose a conduit connection is provided between the reservoir and the hydraulic brake actuating system, and more specifically with the master cylinder of the brake actuating system or its reservoir. The conduit connection has its inlet end positioned at the vortex of the fluid mass in the reservoir adjacent the bottom portion of the vortex and near the apex of the cavity of the vortex whereby the cleanest portion of fluid may be delivered to the conduit line connecting the reservoir with the brake actuating system, the rotation of the mass of fluid in the reservoir causing dirt particles to be centrifuged toward the outer periphery of the rotating fluid mass so that they can fall into a dirt trap provided below the apex of the cavity of the vortex.

Further objects and advantages of the present invention will be apparent from the following description, reference being had to the accompanying drawings wherein a preferred form of the invention is clearly shown.

Figure 1:
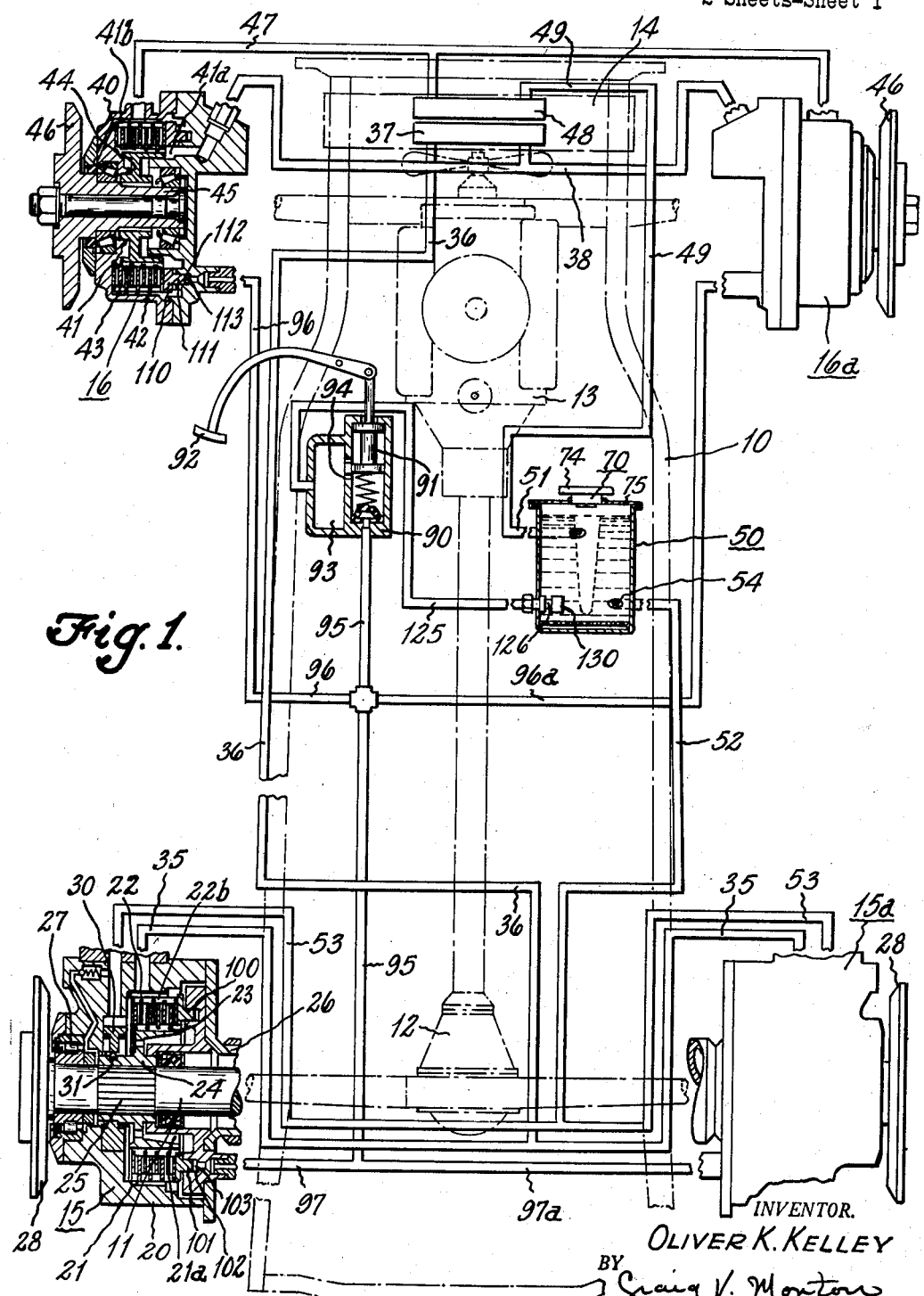
Figure 1 is a schematic illustration of a brake system incorporated on a multiple wheel vehicle and including features of this invention.

The brake system of this invention is applied to a motor vehicle that includes a frame 10 having a rear axle 11 connected through the differential 12 with the engine 13. The engine 13 is connected with a radiator 14 in conventional manner.

Wheel brakes 15 and 15a are adapted for connection with the rear axle 11 and with a rear wheel in conventional manner. Front brakes 16 and 16a are connected with front wheel in conventional manner and are adapted to be supported at opposite sides of the vehicle in the usual manner.

The rear brakes 15 and 15a are of similar construction so that only one of the devices is described herein. More particularly, each of the brakes 15 and 15a comprise a brake housing 20 that encloses a brake chamber 21 containing a plurality of stationary brake disks 22 and rotating brake discs 23. The rotating brake disks 23 are carried upon a disk carrier 24 that is supported upon and drivingly connected to the axle 11 through the spline connection 25. The stationary brake disks 22 are similarly connected or splined with the brake housing 20 through a suitable connection whereby the disks 22 are maintained stationary relative to the rotating disks 23.

Brake housing 20 is supported upon the axle housing 26 in any suitable manner and the axle 11 is journaled in the brake housing 20 by means of a suitable anti-friction bearing member 27. The extending end of the axle 11 carries a wheel flange 28 adapted to demountably receive a conventional wheel.

A liquid pump 30 of any conventional vane type is provided within the brake housing 20 and is suitably keyed to the disk carrier 24 by means of the key connection 31 whereby to effect rotation of the pump 30 concurrently with rotation of the disk carrier 24 and thus with rotation with the rear axle 11. The pump 30 is thus driven whenever the axle 11 rotates, and thus whenever the motor vehicle is in motion.

The liquid pump 30 delivers coolant liquid under pressure into the interior chamber 21a of the brake chamber 21 for circulation between the friction disks 22 and 23 whereby to pick up heat of friction when the disks are in engaged position. The disks 22 or 23, one or the other or both, are provided with grooved faces whereby the liquid coolant can circulate from the inner brake chamber 21a into the outer brake chamber 22b under forced flow as caused by the pump 30.

Heated liquid is delivered from the outer brake chamber 22b into the conduit line 35 from which it flows through the conduit 36 into a heat exchange device 37 that is provided in the lower portion of the radiator 14 that serves the engine 13 whereby the heat of friction picked up by the liquid coolant from the brake 15 is removed and a cooled liquid coolant is then delivered into the conduit line 38 for delivery into the front wheel brakes 16 and 16a.

The front wheel brakes each include a brake housing 40 having a brake chamber 41 that contains a plurality of stationary brake disks 42 and a plurality of rotating brake disks 43. The stationary brake disks 42 are connected with the housing 40 whereby to retain them in a stationary condition, the housing 40 being suitably connected with the frame of the vehicle through a conventional suspension system. Rotating disks 43 are supported upon a brake disk carrier 44 that is splined to the spindle 45 and carries a wheel flange 46 for demountably supporting a front wheel in any conventional manner.

Liquid coolant delivered into the circulating line 38 is directed to the interior chamber 41a for circulation between the brake disks 42 and 43 in the same manner as liquid coolant is circulated between the brake disks 22 and 23 of the rear brakes 15. The coolant circulated between the brake disks 42 and 43 is delivered into the outer brake chamber 41b and from thence it is delivered into the circulating conduit line 47 for delivery to a second heat exchange device 48 located in the engine radiator 14 for removal of heat from the liquid coolant that was picked up in the front wheel brakes 15.

Liquid coolant delivered into the heat exchange device 48 is then delivered into the circulating line 49 for return to a fluid reservoir 50 by way of the inlet line portion 51. Coolant liquid is removed from the reservoir 50 through the suction line 52 that connects with the pumps 30 in the rear wheel brakes 15 and 15a through the conduit line 53, the conduit line 52 having a line portion 54 that connects with the reservoir 50.

From the foregoing description it will be apparent that liquid coolant is circulated by means of the pumps 30 in the rear wheel brakes 15 for delivery through a heat exchange device and then returned to the reservoir 50. The conduit lines 52 and 53 offer some degree of restriction to the flow of liquid from the reservoir to the pumps 30 of the rear wheel brakes 15. Such restriction tends to reduce the capacity of the pumps 30 for delivery of fluid under pressure into the brake chambers 21 and for circulation through the coolant circulating system, a certain portion of the capacity of the pump being utilized to draw liquid from the reservoir 50 into the inlet side of the pump 30. If this restriction is high or should become high for any reason there even may result a cavitation in the pump which would seriously effect the volume of liquid delivered from the pump into the circulating system.

Figure 2:
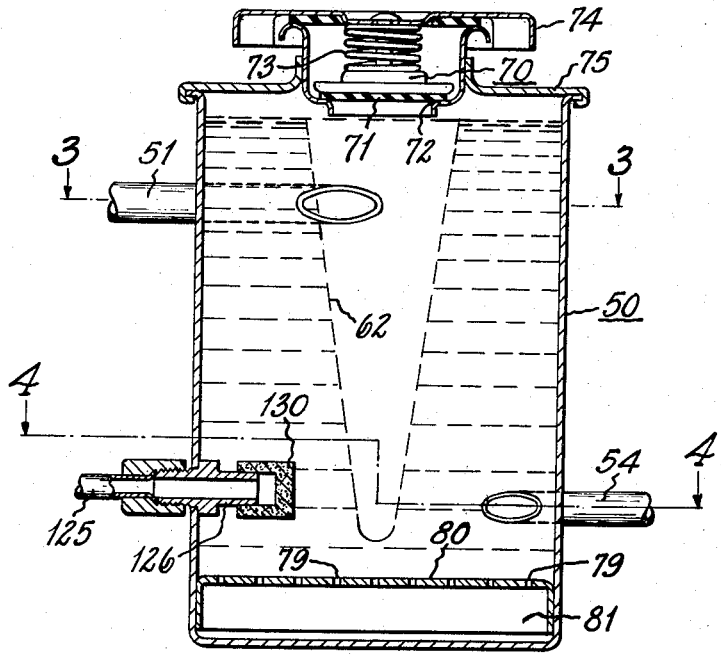
Figure 2 is a cross sectional view of a reservoir containing features of this invention.
Figures 3, 4:
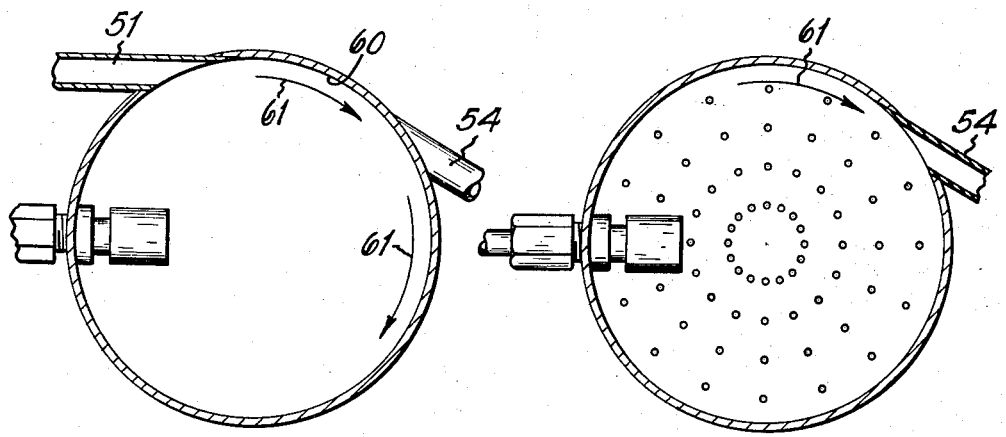
Figure 3 is a transverse cross section taken along line 3—3 of Figure 2.
Figure 4 is a transverse cross section taken along line 4—4 of Figure 2.

As more particularly shown in Figures 2, 3, and 4 the liquid reservoir 50 is constructed and arranged in a manner that the kinetic energy of the flow of liquid coolant entering the reservoir may be utilized to effect a pressure flow of liquid coolant from the reservoir into the suction inlet line 52 that connects with the pump 30 and thereby pressure charge the line 52 and the inlet side of the pump 30 to cause a positive pressure flow of liquid from the reservoir 50 into the pump which substantially increases the volume of liquid that may be circulated by the pump 30. Obviously, if the pressure differential between the inlet and outlet sides of the pump is reduced, the pumping capacity of the pump is increased since then the pump is merely required to circulate fluid under pressure rather than expend a part of its energy in negative force attempting to draw fluid from the reservoir 50.

As shown in Figures 2, 3, and 4, the reservoir 50 is of a cylindraceous transverse cross section. The inlet line 51 into the reservoir 50 has the liquid flow therethrough under pressure as caused by a circulation of the fluid by the pump 30. This inlet line 51 is tangential to the inner periphery 60 of the reservoir 50, as shown in Fig. 3. The line of liquid flow discharging from the inlet conduit 51 under pressure is therefore tangential to the inner periphery of the reservoir. As indicated by the arrow 61, the forced delivery of the liquid under pressure into the reservoir 50 through the tangentially disposed line 51 causes the mass of liquid within the reservoir 50 to rotate and thereby form a liquid vortex, as more particularly shown in Fig. 2, the vortex cavity 62 having its apex near the bottom wall of the reservoir 50.

The discharge line 54 from the reservoir 50 is also disposed substantially tangential to the inner periphery of the reservoir 50, as shown in Fig. 4, but at a lower level, that is substantially below the inlet line 51, as shown in Fig. 2.

The kinetic energy of the liquid under pressure discharging into the reservoir 50 from the pressure inlet line 51 expends itself in effecting a rotation of the mass of liquid within the reservoir creating the vortex. Thus the rotating mass of liquid causes a pressure delivery of the liquid from the reservoir into the outlet line 54 whereby to utilize the kinetic energy of the mass of liquid to establish an inlet pressure in the line 54 and thus establish a pressure on the inlet side of the pump 30.

With the inlet line 54 and the inlet side of the pump pressurized, the capacity of the pump 30 for circulation of liquid through the brake cooling system is substantially increased. Thus the kinetic energy in the circulating liquid delivered to the reservoir 50 is not completely lost, but a substantial portion of the kinetic energy is recaptured by the pressurization of the inlet side of the pump 30.

Since the liquid is delivered to the reservoir 50 under pressure from the line 51, it is preferable that the reservoir 50 be sealed to retain the liquid under pressure, and yet be able to provide for relief of excess pressure in the event there should be some gasification internally of the liquid coolant system. For this purpose there is provided a pressure member 70 having a valve element 71 retained upon a valve seat 72 by means of a light compression spring 73. The pressure member 70 is carried within a closure cap 74 that is suitably secured to the top wall 75 of the reservoir 50 for removal therefrom in much the same manner as the pressure cap of a conventional radiator of a motor vehicle. The coolant circulating system heretofore described is therefore a closed pressurized system.

Since the liquid under pressure entering the reservoir 50 through the inlet line 51 effects a rotation of the liquid mass within the reservoir and results in the liquid vortex heretofore described, dirt particles that are contained in the liquid that have been picked up in the coolant circulating system are drawn to the inner periphery of the mass of liquid forming the low pressure vortex cavity. These dirt particles gradually settle to the bottom of the reservoir 50 and will pass through the openings 79 in the wall 80 and be collected in the chamber 81 forming a dirt trap or sludge trap in the bottom of the reservoir 50.

The brakes 15, 15a and 16, 16a are hydraulically actuated by means of a master cylinder 90 that contains a piston 91 operated by a conventional foot pedal 92. Make-up liquid is supplied into the master cylinder 90 from the master cylinder reservoir 93 through the port opening 94 when the piston 91 is in its fully retracted position, in conventional manner.

Actuation of the master cylinder 90 through the foot pedal 92 causes displacement of hydraulic fluid into the hydraulic line 95 that in turn is connected by means of the lines 96 and 96a with the respective front wheel brakes 16 and 16a. Similarly, the hydraulic line 95 is connected by means of the hydraulic lines 97 and 97a with the respective rear wheel brakes 15 and 15a.

The rear wheel brakes 15 each include a pressure plate 100 that has annular extension 101 slidable within an annular recess 102 in the brake housing 20 thereby forming a chamber 103 that receives hydraulic brake fluid under pressure from the supply line 97 for axially moving the pressure plate 100 for effecting engagement of the brake disks 22 and 23.

Similarly, each of the front wheel brakes 16 and 16a are provided with a pressure plate 110 that has an annular extension 111 slidable within an annular recess 112 forming a chamber 113 that receives hydraulic fluid under pressure from the supply lines 96, whereby the pressure plate 110 is caused to move axially to effect engagement of the brake disks 42 and 43.

To provide for clean hydraulic fluid that can be supplied to the brake actuating system heretofore described, there is provided a conduit connection 125 from the reservoir 50 with the master cylinder reservoir 93, whereby the liquid from the liquid reservoir 50 can be transferred into the master cylinder reservoir 93 for supply to the master cylinder 90. Since it is desired to provide only clean fluid to the master cylinder reservoir 93, the inlet portion 126 of the conduit line 125 is disposed within the reservoir 50 adjacent the outer periphery of the vortex of the mass of fluid within the reservoir and near the bottom portion therefore so as to pick up the cleanest possible fluid within the reservoir for delivery to the master cylinder reservoir 93 whenever needed. It is to be understood that the master cylinder reservoir 93 is normally disposed below the reservoir 50 so that there will be a natural gravity flow of liquid from the reservoir 50 into the master cylinder reservoir 93.

To still further insure clean liquid passing from the reservoir 50 to the master cylinder reservoir 93, a porous filter 130 is provided on the inlet end of the inlet portion 126 of the conduit 125 so as to insure full and complete filtration of all liquid entering the conduit 125 for supply to the hydraulic brake actuating system.

While the form of embodiment of the invention as herein disclosed constitutes a preferred form, it is to be understood that other forms might be adopted as may come within the scope of the claims which follow.

What is claimed is as follows:

1. A brake system for a multiple wheel vehicle, comprising in combination, multiple wheels for a vehicle including friction brake means carried by the respective wheels, a liquid brake actuating system connected with said brake means to effect actuation thereof, said brake actuating system having a liquid displacement member for pressurizing liquid in said liquid actuating system, said liquid displacement member having a reservoir in communication therewith for maintaining liquid in said liquid actuating system, said friction brake means being constructed and arranged for circulation of cooling liquid between the friction elements of the brake means when engaged to effect removal of heat of friction, liquid-circulating pump means connected by conduit means with said brake means and with heat exchange means for pressure circulation of liquid between the brake means and the heat exchange means, a cooling liquid reservoir having a cylindraceous cross section disposed in said conduit means between said heat exchange means and said pump means, one of said conduit means connecting the heat exchange means with said cooling liquid reservoir with the said one conduit means having the axial line of liquid flow discharging from the said one conduit means under pressure into the said cooling liquid reservoir tangential to the inner periphery of the cooling liquid reservoir to effect thereby a forced rotary motion to the liquid mass in the cooling liquid reservoir forming a vortex, a second conduit means connecting said cooling liquid reservoir to the suction inlet side of said pump means with the said second conduit means having the axial line of liquid flow of the inlet end of the conduit tangential to the inner periphery of the cooling liquid reservoir and at the outer periphery of the vortex and directed oppositely to the direction of rotation of the liquid mass in the cooling liquid reservoir to provide thereby pressure delivery of liquid into the said second conduit means for supply to the inlet side of said pump means under pressure, and a third conduit means connecting said cooling liquid reservoir with said reservoir in said liquid brake actuating system with the inlet of said third conduit disposed in the fluid vortex adjacent the bottom of the fluid mass and adjacent the outer periphery of the vortex, said inlet is provided with a porous filter, said cooling liquid reservoir including a dirt trap comprising a perforated metal disk with a flanged portion extending downward along the wall of said cooling liquid reservoir, said dirt trap disposed below the apex of the cavity of the vortex and below the inlet end of said third conduit means.

2. A brake system for a multiple wheel vehicle, comprising in combination, a plurality of wheels for a vehicle including friction brake means carried by the respective wheels, a liquid brake actuating system connected thereto for actuation of said braking means, said brake actuating system having a liquid displacement member for pressurizing liquid in said liquid brake actuating system, said liquid brake actuating system having a reservoir in communication with said liquid displacement member, said friction brake means being constructed and arranged for circulation of cooling liquid between the friction elements of the brake means when engaged to effect removal of heat of friction, liquid circulating pump means connected by conduit means with said brake means and with heat exchange means for pressure circulation of liquid between the brake means and the heat exchange means, a cooling liquid reservoir having cylindraceous cross section conduit means disposed in said conduit means between said heat exchange means and said pump means, one of said conduit means connecting the said exchange means with said cooling liquid reservoir with said one conduit means having the axial line of liquid flow discharging from said conduit means under pressure into the said cooling liquid reservoir tangential to the inner periphery of the cooling liquid reservoir to effect thereby a forced rotary motion to the liquid mass in the cooling liquid reservoir forming a vortex, a second conduit means connecting said cooling liquid reservoir to the suction inlet side of said pump means with said second conduit means having the axial line of liquid flow of the inlet end of the conduit tangential to the inner periphery of the cooling liquid reservoir and that the outer periphery of the vortex and the direction oppositely to the direction of rotation of the liquid mass in the cooling liquid reservoir to provide thereby pressure delivery of the liquid into the said second conduit means for supply under pressure to the inlet side of said pump means, and a third conduit means connecting said cooling liquid reservoir with said reservoir in said liquid brake actuating system with the inlet of said third conduit disposed in the fluid vortex adjacent the bottom of the fluid mass and adjacent the outer periphery of the vortex, said third conduit means providing continuous communication between said cooling liquid reservoir and said liquid brake actuating reservoir, said cooling liquid reservoir including a dirt trap comprising a perforated metal disk with a flange portion extending downward along the wall of said cooling liquid reservoir, said dirt trap disposed below the apex of the cavity of the vortex and below the inlet end of said conduit means thereby providing a static chamber beneath said dirt trap and separating the fluid within said chamber from the rotating liquid mass forming the vortex within said cooling liquid reservoir.

References Cited in the file of this patent

UNITED STATES PATENTS

| | | |
|---|---|---|
| 2,187,646 | Darrieus | Jan. 16, 1940 |
| 2,195,130 | Hoyt | Mar. 26, 1940 |
| 2,209,784 | Maack et al. | July 30, 1940 |
| 2,287,130 | Ramey | June 23, 1942 |
| 2,357,500 | Cann | Sept. 5, 1944 |
| 2,406,304 | Levy | Aug. 20, 1946 |
| 2,655,054 | Kelley | Oct. 13, 1953 |
| 2,767,968 | Buettner | Oct. 23, 1956 |

FOREIGN PATENTS

| | | |
|---|---|---|
| 896,915 | Germany | Nov. 16, 1953 |